United States Patent [19]
Jones

[11] 3,757,880
[45] Sept. 11, 1973

[54] SELF-PROPELLED SNOW SLED

[76] Inventor: Claude A. Jones, R.D. 4, Box 140, Nazareth, Pa. 18064

[22] Filed: Dec. 22, 1971

[21] Appl. No.: 210,674

[52] U.S. Cl. ............................................. 180/5 R
[51] Int. Cl. ........................................... B62m 27/02
[58] Field of Search ................. 180/5 R, 6; 280/28

[56] References Cited
UNITED STATES PATENTS

| | | | |
|---|---|---|---|
| 1,684,846 | 9/1928 | Pearson | 180/6 R |
| 1,916,643 | 7/1933 | Steele | 180/6 R |
| 1,696,125 | 12/1928 | Rantasa | 180/5 R |
| 3,190,671 | 6/1965 | Fabris | 280/28 X |

*Primary Examiner*—Richard J. Johnson
*Attorney*—Michael J. Delaney

[57] ABSTRACT

Apparatus for use in traveling over terrain covered by snow and/or ice which comprises a vehicle having a pair of spaced parallel runners and support frame pivotally mounted at the forward end thereof for supporting the motor and tractive means. The rearward portion of said frame is adapted to move freely vertically while being contained laterally.

3 Claims, 5 Drawing Figures

PATENTED SEP 11 1973

3,757,880

INVENTOR
Claude A. Jones
BY Michael J. Delaney

SELF-PROPELLED SNOW SLED

BACKGROUND OF THE INVENTION

This invention relates generally to vehicles for negotiating snow and/or ice covered terrain and more particularly to a self-propelled sled-type vehicle having unique motor mounting means.

Snow vehicles of varied descriptions are available to the general public, the design depending generally on the end use of the vehicle. The inventor has developed a versatile self-propelled snow sled for such uses as cross country riding, utility vehicle for towing across snow or as a purely sportsman's apparatus, e.g., racing vehicle. The unique design of this self-propelled snow sled mounts the motor drive unit so that the weight is used to good advantage, resulting in a more efficient use of available power.

It is an object of this invention, therefore, to provide a self-propelled snow sled having a front end drive pivotally mounted on the forward end thereof.

It is another object of this invention to provide a snow vehicle having spaced parallel runners and having drive means specially mounted to conserve power.

It is a further object of this invention to provide a self-propelled snow sled having a unique steering system for use in pleasure, utility or sport sledding.

SUMMARY OF THE INVENTION

The instant invention accomplishes these objects by providing a self-propelled snow sled comprising a pair of spaced parallel runners with power means mounted therebetween and a support frame which is pivotally mounted at one end but free to move up and down at the other end according to the terrain. The power means includes a motor and tractive unit driven by said motor for propelling the snow sled. The steering system for the snow sled includes runners which are specially designed for easy maneuverability.

DESCRIPTION OF THE PREFERRED EMBODIMENT

Figure 1:
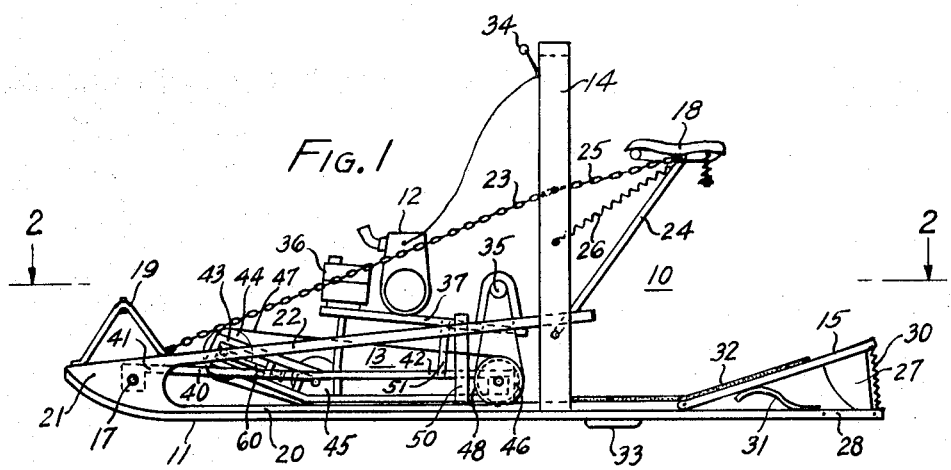
FIG. 1 is a side elevational view of the apparatus.
Figure 2:
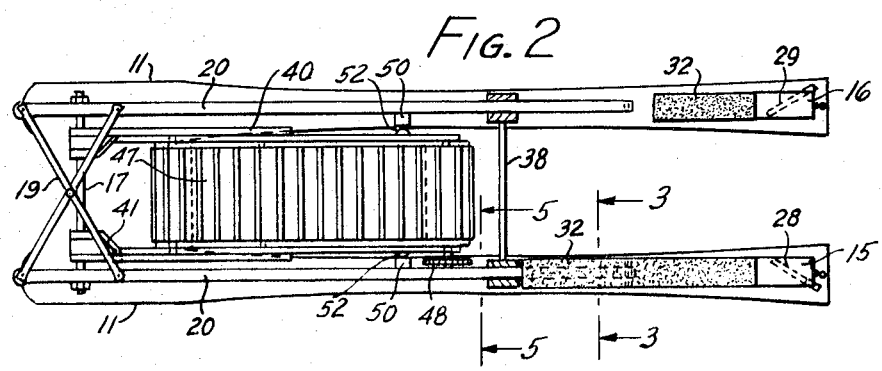
FIG. 2 is a plan view of the apparatus taken on line 2—2 of FIG. 1 with parts removed for clarity.

Referring now to the Figures and more particularly to FIGS. 1 and 2, the snow sled 10 of the instant invention is seen to comprise generally a pair of spaced parallel runners 11, motor means 12, tractive means 13, steering frame 14, brake pedals 15 and 16, support frame 40 and seat 18. Cross brace assembly 19 fashioned from tubular members provides stability for the forward portion of the snow sled. Drive control means 34 are conveniently located on steering frame 14. A rigid panel 38 inserted between the vertical members of steering frame 14 connects the runners 11 of sled 10 at the steering frame intermediate the ends of the sled and also serves as a fire wall.

The spaced parallel runners 11 are seen in FIG. 2 to have longitudinal edges with a configuration which is arcuately concave. A reinforcing member 20 is provided on the top side of the runners 11 and is integral with the bow piece 21 at the front end of the sled. Rails 22 tie the bow piece 21 back to the steering frame 14. Chains 23 are connected from the bow piece 21 to the upper portion of steering frame 14 for purposes that will become apparent. The operator's seat 18 which can be moved toward and away from steering frame 14 is supported on the sled 10 by means of tubular members 24 which are pivotally attached to the lower portion of steering frame 14. Chains 25 limit the rearward movement of seat 18 and spring 26 biases seat 18 toward steering frame 14 for storage when not in use. It will be understood that the choice of using or storing the seat while the sled is in operation will be according to the desire of the operator, the sled being maneuverable by the operator from either the seated or standing position.

Brake pedals 15 and 16 are provided at the rear portion of runners 11 serving as rudder means as well as brakes and comprising a foot pad of fibrous material 32 with a pointed plow-shaped member 27, preferably metal, mounted on the underside thereof. Slots 28 and 29 are provided in the rear portion of runners 11 for the plow-shaped members 27 to pass freely through when depressed to provide braking means for the sled or additionally as a steering aid. Short chain sections 30 limit the upward movement of the brake pedals 15 and 16 biased upward by means of leaf spring 31. The foot pad of fibrous material 32 is applied to the upper surface of the runner reinforcing members 20 extending rearward of the steering frame onto the brake pedals 15 and 16 to provide a safety grip surface for the operator to stand on. Attached to the underside or snow engaging surface of each of the runners 11 and positioned slightly to the rear of steering frame 14 is a short inverted channel guide member 33 for purposes that will be presently described.

Still referring to FIGS. 1 and 2 the motor means 12, tractive means 13 and the gear train 35 therebetween is seen mounted on support frame 40. Motor 12 and fuel tank 36 rest on mounting plate 37 which is attached to frame 40. Support frame 40 having a forward portion 41 and a rearward portion 42 is pivotally mounted at the forward portion 41 to axle 17 at the front end of the snow sled 10 between the pair of spaced parallel runners 11. Idler frame 43 is attached to and forms a part of rearward portion 42 of the support frame 40. Tractive means 13 comprises idler wheels 44 and 45 and drive wheel 46 surrounded by endless belt 47. The endless belt 47 is a flexible material, similar to conveyor belt material, on which channel sections are attached running transversely of the belt with the channel flanges extending outwardly from the surface of the belt 47. Sprocket 48 is attached to drive wheel 46 and through the gear train 35 to the motor 12, thus providing the drive for the tractive means 13. Idler 44 is provided with adjustable mounting 60 to serve as a takeup.

Figures 3, 4, 5:
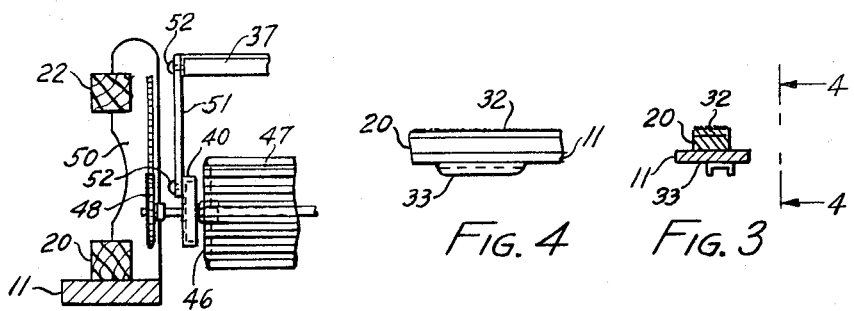
FIG. 3 is an enlarged sectional view of one of the runners of the apparatus taken on line 3—3 of FIG. 2.
FIG. 4 is a side view of a fragmentary portion of one of the runners of the apparatus taken on line 4—4 of FIG. 3.
FIG. 5 is an enlarged sectional view taken on line 5—5 of FIG. 2.

FIG. 3 is an enlarged cross-section through runner 11 showing guide member 33 comprising a section of channel attached to the underside of runner 11 mounted slightly off the center and toward the inside of runner 11 with the flanges extending downward to penetrate the snow and/or ice layer on the ground. The purpose of this guide member is to aid in steering as will be understood from the description of the operation to follow. A pad of fibrous material 32 such as a piece of carpeting or rubber safety tread is applied to the upper surface of runner 11 and brake pedals 15 and 16 to provide a non-slip area for the operator's feet. FIG. 4 is a side elevational view taken on line 4—4 of FIG. 3 showing the channel guide member 33 with the leading and trailing edges rounded.

The means for guiding the rearward portion of pivotally mounted support frame 40 up and down while containing the sidewise movement thereof is seen in FIG. 5 which is an enlarged section of a portion of one side of the sled 10. The sled is substantially symmetrical about its longitudinal axis. A vertical member 50 is seen attached to the runner 11 and reinforcing member 20 and to rail 22 to provide a guide surface on which members 51 attached to the rearward portion 42 of support frame 40 rides up and down freely. Round head fasteners 52 are used to attach members 51 to the support frame 40 so that friction between the support frame 40 and vertical guide members 50 is minimal.

In operation: the snow sled 10 is designed to be used by the operator either seated on the bicycle-type seat 18 or standing on the foot pads 32 covering a portion of runners 11. The seat 18 is retracted when the sled is operated from a standing position. Control means 34 for the motor and tractive unit are conveniently mounted on steering frame 14. The sled is propelled by power supplied by the motor 12 through conventional gear train 35 components driving endless belt 47 which is in contact with the snow or ice covered ground surface. The pivotal mounting, at the front end of the sled 10, of the motor means support frame 40 and the mounting of the motor and tractive means on the rearward portion of the support frame 40 concentrates the weight of the drive means on the endless belt 47 adjacent the drive wheel 46, thus providing a downward force that increases the traction between the belt 47 and the snow or ice surface. The traction thus provided prevents spinning of the belt and consequent waste of power from the motor and also contours to uneven surfaces.

The operator is provided with a steering system having a variety of component parts which may be utilized individually or in any of several combinations. For relatively smooth terrain and powdery snow a mere shift of weight by the operator to one side will guide the sled in the desired direction by virtue of the arcuately concave shape of the longitudinal edges of the runners 11. The chains 23 which connect the front end of the sled to the steering frame 14 help to tilt the vehicle in the direction of turning as the steering frame 14 is maneuvered to the right or left as desired. When the snow is crusted or when travelling over ice the inverted channel of guidemember 33 on the underside of runners 11 will bite into the ice and aid in steering the sled.

The plow-shaped brake discs 27 which are mounted at the rear end of the sled and adapted to pass through slots in the runners to engage the snow or ice surface are mounted at an angle to the direction of travel of the sled. It will be readily apparent to those skilled in the art that depression of the two brake pedals 15 and 16 simultaneously affords an effective braking to the sled. In addition, it is also apparent that depression of one pedal coupled with the aforementioned shift of weight to the side will result in a sharp turn in the desired direction. It will also be understood by those skilled in the art that upon throttling down on the motor the tractive means 13 will immediately provide braking of the vehicle.

It is therefore seen that the self-propelled snow sled of the instant invention provides a highly maneuverable and efficient machine for use in snow or ice covered terrain whether the snow is powdery and easily packed or has an ice crust which is difficult to penetrate.

I claim:

1. A self-propelled snow sled comprising in combination:
   a. a pair of spaced parallel runners having arcuately concave longitudinal edges and connecting means at the front end thereof upwardly spaced from said runners a distance sufficient to avoid contact with snow,
   b. a steering frame and operator's station mounted on and connecting said parallel runners intermediate the ends thereof,
   c. a support frame pivotally mounted on said front end of said pair of spaced parallel runners, extending rearwardly and between said runners, and terminating in a rearward portion forward of said steering frame and operator's station,
   d. an endless belt mounted on said support frame and arranged to contact said snow forward of said steering frame and operator's station,
   e. motor means mounted on said rearward portion of said support frame disposed above and overlying said endless belt to drive said belt, and
   f. rudder means mounted on each of said spaced parallel runners.

2. A self-propelled snow sled according to claim 1 further including:
   g. fixed runner guide means mounted on said pair of spaced parallel runners.

3. A self-propelled snow sled according to claim 2 wherein
   said fixed runner guide means comprises an inverted channel section attached to a snow engaging portion of said runners.

* * * * *